United States Patent
Feast et al.

(10) Patent No.: US 9,947,342 B2
(45) Date of Patent: Apr. 17, 2018

(54) METHOD AND APPARATUS FOR SPEECH BEHAVIOR VISUALIZATION AND GAMIFICATION

(71) Applicant: Cogito Health Inc., Boston, MA (US)

(72) Inventors: Joshua Feast, Boston, MA (US); Ali Azarbayejani, Boston, MA (US); Skyler Place, Boston, MA (US)

(73) Assignee: Cogito Corporation, Boston, MA (US)

( * ) Notice: Subject to any disclaimer, the term of this patent is extended or adjusted under 35 U.S.C. 154(b) by 464 days.

(21) Appl. No.: 14/205,602

(22) Filed: Mar. 12, 2014

(65) Prior Publication Data

US 2015/0264177 A1    Sep. 17, 2015

(51) Int. Cl.
*H04M 3/51* (2006.01)
*G10L 25/48* (2013.01)
*G06Q 10/06* (2012.01)
*H04M 7/00* (2006.01)

(52) U.S. Cl.
CPC .......... *G10L 25/48* (2013.01); *G06Q 10/0639* (2013.01); *H04M 3/5175* (2013.01); *H04M 3/5183* (2013.01); *H04M 7/009* (2013.01); *H04M 2203/252* (2013.01); *H04M 2203/357* (2013.01)

(58) Field of Classification Search
CPC .......... H04M 3/5175; H04M 3/42221; H04M 2201/40
USPC ........................................ 379/265.06, 265.07
See application file for complete search history.

(56) References Cited

U.S. PATENT DOCUMENTS

| | | |
|---|---|---|
| 6,480,600 B1 | 11/2002 | Neyman et al. |
| 6,754,331 B2 | 6/2004 | McCormack |
| 7,606,718 B2 | 10/2009 | Cloran |
| 8,068,599 B2 | 11/2011 | Sarin et al. |
| 8,078,470 B2 † | 12/2011 | Levanon |
| 8,204,747 B2 † | 6/2012 | Kato |

(Continued)

FOREIGN PATENT DOCUMENTS

| | | |
|---|---|---|
| EP | 2 297 933 A1 | 3/2011 |
| EP | 2 600 292 A1 | 6/2013 |
| WO | WO-2009/153581 A1 | 12/2009 |

OTHER PUBLICATIONS

De Jong, N. H. and Wempe, T., Praat script to detect syllable nuclei and measure speech rate automatically, Behavior Research Methods, 41(2):385-390 (2009).

(Continued)

*Primary Examiner* — Nafiz E Hoque
(74) *Attorney, Agent, or Firm* — Choate, Hall & Stewart LLP; William R. Haulbrook; Alexander D. August (57) ABSTRACT

The disclosed system and methods provide real-time information about how agents and customers sound as they are speaking, allowing a supervisor to continuously monitor how agents are doing. The system allows agents to visualize their own speech behavior performance during and after a conversation while viewing important comparative information about prior conversations, and gamifies conversations in real-time by providing visual comparison between the live conversations and various target metrics. The visualization in-turn enhances agent interactive skills such as active listening and mirroring, as well as decision-making skills based on observations of customer engagement and distress levels.

26 Claims, 5 Drawing Sheets

(56) References Cited

U.S. PATENT DOCUMENTS

| | | |
|---|---|---|
| 8,537,983 B1 | 9/2013 | Haggerty et al. |
| 2004/0249639 A1 | 12/2004 | Kammerer |
| 2006/0233346 A1 | 10/2006 | McIlwaine et al. |
| 2007/0195945 A1 | 8/2007 | Korenblit et al. |
| 2008/0103781 A1 | 5/2008 | Wasson et al. |
| 2011/0033036 A1 | 2/2011 | Edwards et al. |
| 2011/0178803 A1 | 7/2011 | Petrushin |
| 2011/0282663 A1 | 11/2011 | Talwar et al. |
| 2011/0307258 A1 | 12/2011 | Liberman et al. |
| 2013/0028399 A1 | 1/2013 | Kopparapu et al. |
| 2013/0177148 A1 | 7/2013 | Lee |
| 2013/0195302 A1 | 8/2013 | Meincke et al. |
| 2013/0208881 A1 | 8/2013 | Pande et al. |
| 2014/0140497 A1* | 5/2014 | Ripa .............. H04M 3/5133 379/265.06 |
| 2015/0348570 A1 | 12/2015 | Feast et al. |
| 2015/0364130 A1 | 12/2015 | Ponting et al. |

OTHER PUBLICATIONS

Hillenbrand, J. and Houde, R. A., Acoustic Correlates of Breathy Vocal Quality: Dysphonic Voices and Continuous Speech, Journal of Speech and Hearing Research, 39:311-321 (1996).

International Search Report, PCT/US15/20303, 4 pages, dated Jul. 31, 2015.

Liu, H.M. et al., The effect of reduced vowel working space on speech intelligibility in Mandarin-speaking young adults with cerebral palsy, J. Acoust. Soc. Am. 117(6):3879-3889 (2005).

Lugger, M. et al., Robust Estimation of Voice Quality Parameters Under Real World Disturbances, IEEE, Proceedings of ICASSP, I-1097-I-1100 (2006).

Morgan, N. and Fosler-Lussier, E., Combining Multiple Estimators of Speaking Rate, International Conference on Acoustic, Speech, and Signal Processing (ICASSP-98) 729-732 (1998).

Morgan, N. et al., Speech Recognition Using On-Line Estimation of Speaking Rate, ESCA, Eurospeech97, Rhodes, Greece, ISSN 1018-4074:2079-2082 (1997).

Picart, B. et al., Analysis and Synthesis of Hypo and Hyperarticulated Speech, Proceedings of the Speech Synthesis Workshop (SSW), 8 pages, (2010).

Scherer, S. et al., Reduced Vowel Space is a Robust Indicator of Sychological Distress: A Cross-Corpus Analysis, ICASSP 4789-4793 (2015).

Stevens, K. N. and Hanson, H. M., Classification of Glottal Vibration from Acoustic Measurements, Vocal Fold Physiology, 147-170 (1994).

Written Opinion, PCT/US15/20303, 11 pages, dated Jul. 31, 2015.

\* cited by examiner
† cited by third party

METHOD AND APPARATUS FOR SPEECH BEHAVIOR VISUALIZATION AND GAMIFICATION

CROSS-REFERENCE TO RELATED APPLICATIONS

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2014 Cogito Corp.

BACKGROUND

Field of Technology

This disclosure relates to audio analysis, and more specifically to provision of a real-time speech behavior visualization and gamification tool that promotes better interpersonal skills and decision-making in conversations, supports situational awareness for call center teams, enables better coaching of call center staff by supervisors, and enables higher quality interactions with customers.

Background

R&D focused on customer connections to and from the call center has been around for some time, and supervisors and managers will review call length and call frequency data from time-to-time to understand performance. Thanks to speech-to-text technologies, they may also search recordings of conversations for key words. However, so far the art has not found effective ways to support active feedback, supervision and review of conversations based on behavior, especially in real time and across distributed teams. In this context, the term behavior refers to how people speak, and specifically the tonal, pacing, mirroring and turn-taking measurements that describe how people come across to each other independently of the words that they use.

Providing an excellent customer experience in call centers has increasingly become strategic for enterprise, and there is an increasing understanding that how an agent comes across can affect conversation outcomes. The status quo in call center agent feedback and supervision is for supervisors to randomly select an agent-member conversation to listen to and provide commentary. Agents have few tools that readily support self-study and self-improvement. Supervisors have no way to track multiple agents, and few methods for intelligently selecting which conversation to listen in on. Many supervisors only review a single conversation a month for each of the agents in their team and thus have little information about how their agents are sounding while they are speaking with customers. This situation becomes even more challenging because call center teams are increasing dispersed, with many agents now working from home thus reducing a supervisor's ability to listen for tone and behavior by walking around an office space. At the same time, call center teams can also suffer from significant turnover, resulting in a high need for training.

DESCRIPTION OF PRIOR ART

United States Patent Application Publication 2011/0307258 "Real-Time Application of Interaction Analytics" (Liberman et al. Dec. 15, 2011) discloses, in the Abstract, "A method and apparatus for providing real-time assistance related to an interaction associated with a contact center, comprising steps or components for: receiving at least a part of an audio signal of an interaction captured by a capturing device associated with an organization, and metadata information associated with the interaction; performing audio analysis of the at least part of the audio signal, while the interaction is still in progress to obtain audio information; categorizing at least a part of the metadata information and the audio information, to determine a category associated with the interaction, while the interaction is still in progress to obtain audio information; and taking an action associated with the category."

U.S. Pat. No. 6,480,600 "Call and Data Correspondence in a Call-in Center Employing Virtual Restructuring for Computer Telephony Integrated Functionality" (Neyman et al. Nov. 12, 2002) discloses, in the Abstract, "A call center having agent stations comprising telephones connected to computer stations by a Telephone Application Programming Interface (TAPI)-compliant bridge has data pertaining to callers stored in a database on a local area network (LAN) to which the computer stations are also connected. Origination data for incoming calls, both conventional calls to the telephones and computer-simulated calls to the computer platforms, is used as a key to extract data pertaining to calls from the database for display on video display units (VDUs) of the computer workstations where the calls are terminated. In some cases, data is only extracted and displayed for calls from previously listed origination points."

United States Patent Application Publication 2013/0177148 "System and Method for Analyzing Agent Interactions" (Lee Jul. 11, 2013) discloses, in the Abstract, "A system and method for analyzing agent interactions is provided. An interaction between an agent and a business is provided to analysts. Performance scores for the interaction are received from each of the analysts and compared. A deviation between the performance score is determined. The deviation is compared to a threshold. Further interactions are provided to at least one of the analysts when the deviation falls below the threshold. A further performance score for the interaction is received from the analyst and provided to the agent associated with the interaction."

United States Patent Application Publication 2007/0195945 "Systems and Methods for Facilitating Contact Center Coaching" (Korenblit et al. Aug. 23, 2007) discloses, in the Abstract, "Systems and methods for facilitating contact center coaching are provided. In this regard, a representative method includes: receiving information corresponding to a condition indicating that the agent is failing to meet pre-established criteria; scheduling a coaching meeting with the agent in order to address the condition; and scheduling training for the agent based, at least in part, on information obtained during the coaching meeting, the training being selected to address the condition; wherein the information corresponding to the condition, the information corresponding to the coaching meeting, and information corresponding to the training is integrated into a coaching session form."

The prior art teaches post-call analysis in in-call voice recognition, but does not teach features including: real-time perceptual analysis; gamification of such analysis with respect to historical or target metrics; real-time in-call display to the agent; and real-time multi-call display to a supervisor. What is needed, therefore, is a system that overcomes the above-mentioned limitations and that includes the features enumerated above.

BRIEF SUMMARY

Disclosed is a system for extracting and visualizing behavioral insight from speech interactions in real-time. The system provides a scalable solution for the real-time capture, transformation, and visualization of the non-verbal components of speech and voice interactions. Vocal signals, such as speaking rate, conversational flow, dynamism, vocal effort and events such as laughter and audible breathing are extracted from audio streams such as phone calls, transformed into quantitative values that change over time, and visualized in a dashboard display. The system also allows for the visualization of multiple live conversations simultaneously, allowing for the observation and monitoring of multiple individuals. For example, call center supervisors can monitor the conversations of many agents in real-time, and use the visualized information to drive their training, monitoring, and feedback processes. Agents can review their prior conversations, and evaluate both their own signal data as well as that of anyone they were speaking with, allowing for longitudinal analysis of customer reactions, interest and engagement. Furthermore, the system provides a gamification element, by visualizing in real-time individual and team progress against benchmarks, prior performance, team averages or other company dictated milestones. This drives agent and supervisor performance and engagement with their existing workflow, helping a company further achieve stated milestones. Overall, the system is designed to visualize vocal signal information to agents and supervisors, allowing them to utilize these changing metrics to inform their own decision making process. In this sense, the system provides situational awareness for speech interactions.

Features and Advantages

In a call center, the system enhances supervisors ability to monitor agent performance. With distributed and remote offices, including capabilities for many agents to work from home, direct supervision of agents is often difficult. The system enables real-time remote monitoring of calls and call outcomes, allowing supervisors to better monitor and help guide agents within and between calls, who are either local and remote to the supervisor. The system further includes behavioral signal analysis that is universal and independent of language. This enhances support of dispersed teams from different countries and cultural backgrounds, making it easier to be successful with call center "off-shoring."

The system provides analysis for training agents and enhancing their skills. The system provides continuous agent feedback on vocal attributes, which may be used when training new employees/agents. The feedback provided during calls helps reinforce the lessons presented in training seminars.

The system may monitor, track, and/or analyze member or customer changes over time. The systems provides real-time and post-call quantification of member distress and engagement for each phone interaction. This data is recorded and may be used by agents, supervisors, and/or analysts to understand patterns of member behavior, and utilized to change agent interactions or company policy.

The system may quantify agent performance and member interest relative to business or program outcomes. Quantified data gathered in real-time, at the call or individual level, may be compared to business outcomes and objectives, allowing an analysis of how individual agent performance on calls affects these outcomes. Furthermore, the data may be extracted and included as important input variables to predictive models that forecast business outcomes in advance.

The system may produce context independent values. The system transforms and visualizes behavioral data streams, allowing the agent and/or supervisor to utilize this information to drive their own decision making process. In this fashion the system is context independent, the information available is near universally valuable, when combined with specific training objectives, performance goals, or program outcome achievements. This allows customers to compare signal values across varying agents, programs, or business units.

The system enhances agent skills and decision-making directly through visualization and comparison, injecting a gamification element that makes their work more enjoyable.

The system also improves the customer's call center experience, increasing the probability that they have a successful interaction.

The system analyzes not what a person says, but how they say it. The system combines analytics with human intelligence to drive decision-making, taking advantage of the strengths of both components (technology & human intellect). Most vocal analytic platforms perform automated speech recognition paired with keyword and word prevalence machine learning techniques. This system uses the information in how people are speaking, not what they are saying. Furthermore, this datastream is inherently context independent, and does not have to be trained for a particular environment to provide value. The system provides value through these transformed vocal acoustic data streams.

The system provides real-time processing of vocal acoustic information in a phone call, including both parties. Vocal acoustic information on the call is processed in real time, for both parties on the call. Low-level signal information is processed using time-series oriented machine learning techniques to extract perceptual level features such as, but not limited to, speaking rate, conversational flow, dynamism, activity, vocal effort, and events such as laughter and audible breathing. These transformed values are stored in a database, allowing for the real-time, post-call, and batch analysis of signal data.

The real-time transformed vocal-acoustic data is visualized in single call and multi call dashboards. This allows users to see changes in the underlying agent and customer behavior, intentions, engagement and distress levels in real-time as a call progresses. Both in-call and post-call data can be visualized and presented.

This actionable data visualization allows for the user to make better-informed decisions. The visualized data is an input to the human decision making process. As the visualizations themselves are not driven by decision trees or alert-based algorithms, they can more easily be context independent. Therefore, based on the goals and context of the user, the same information can provide the impetus for different user decisions and actions.

The data gathering, transformation, and visualization components allow for simultaneous computation and presentation of multiple data streams from multiple conversations. A supervisor may monitor many agents in real-time, in a simultaneous instead of serial fashion. This can include work-at-home agents, as the system can monitor datastreams and phone calls from multiple sources, both internal and external to the organization.

Visualizations for both agents and supervisors may include gamification elements, which allow the comparison of the current performance against individual goals, individual past performance, current team-average, current team-best, company benchmarks, or other program related outcomes. Currently in call centers there is no way for agents to have immediate feedback on performance or to compare their performance to their fellow agents. This system creates a competitive game-feel to the normal enterprise work-flow, by introducing self, team, and company comparisons. This drives not only performance, but agent interest and intention, and can build a sense of both individual and team pride in assignments.

The system can be applied to any audio input, expanding application beyond two-party conversations to single person monologues, multi-party conversations, and even non-human speech such as evaluation of computer voice programs.

BRIEF DESCRIPTION OF THE DRAWINGS

In the drawings, closely related figures and items have the same number but different alphabetic suffixes. Processes, states, statuses, and databases are named for their respective functions.

DETAILED DESCRIPTION, INCLUDING THE PREFERRED EMBODIMENT

Terminology

The terminology and definitions of the prior art are not necessarily consistent with the terminology and definitions of the current invention. Where there is a conflict, the following definitions apply.

Conversation: A speech interaction involving one or more human or non-human actors Real-time: In the context of consuming, producing, and transforming time-series signals, real-time means that consumption, production, and transformation of signal elements all can be accomplished at a faster rate than the signal element rate and at low-latency (relative to human perception).

Audio Signal: An electrically represented time-series amplitude signal representing audible sound.

Source Conversational Audio Signal: An Audio Signal representing human speech in the raw form received by the system. Typically this audio signal is channel-separated sound of one or multiple people conversing with one another (each speaker's voice can be isolated from the others) or VoIP (Voice over Internet Protocol) signals, isolated digital signals captured from microphones, etc.

PSTN: "Public Switched Telephone Network". The public telephone network that allows any telecommunications device in the world to communicate with any other.

PBX: "Private Branch Exchange". An organization's private telecommunication network that interfaces with the PSTN and results in multiple Conversational Audio Signals to and from telecommunications devices, including telephones, in the organization. Typically this involves Avaya- or Cisco-branded PBX products.

Streamed Conversational Audio Signal: An Audio Signal representing human speech in the streamed form used internally in the system. One example of such audio signal is in a multiple-channel streamed WAV audio format.

Streamed Signal: Any sequence of Interval-Value Elements with increasing End Time.

Interval-Value Element: An element of a Streamed Signal which contains a time interval, consisting of Begin Time and End Time, and a corresponding value, which can be of any numeric type.

Real-time Audio Capture System: A component that captures Source Conversational Audio signals and transforms them into Streamed Conversational Audio Signals.

Real-time Signal Processing System: A component that consumes Streamed Conversational Audio Signals and produces Computed Streamed Signals, which can represent moving or running metrics characterizing the human conversation represented by the audio signal.

Computed Streamed Signal: Any Streamed Signal produced by the Real-time Signal Processing System as a transformation based on audio signal input.

Operational Datastore: A component that stores and retrieves all Application Data, including Streamed Conversational Audio Signals and Computed Streamed Signals, in Real-time.

Application Data: All data that is represented to a user through the GUI components (Single Agent Dashboard, Multi Agent Dashboard).

Application Server: A component that mediates the consumption and production of Application Data between user interfaces (Single Agent Dashboard, Multi Agent Dashboard) and the Operational Datastore.

Organization: A company or other agency or entity which would typically be the beneficiary of the system. Specifically, the system benefits organizations which maintain have live conversations with important Associates, who could be customers, members, prospective customers, or clients of the Organization.

Agent: A person or input-provider with access to application data stemming from source conversational audio signals of that person or input-provider. In relation to Organizations utilizing the system, an agent is a representative of the Organization who participates in conversations with Associates of the Organization.

Supervisor: A person who is responsible for supervising one or more Agents.

Associate: A non-agent participating in a conversation providing source conversational audio signals. In relation to Organizations utilizing he system, an associate is a person associated with the Organization, as a customer, a member, a prospective customer, a client, or in any other relationship in which speech interactions with the Organization may be a beneficial aspect of the relationship to either party.

Single Agent Dashboard: Real-time Graphical User Interface with which an Agent or Supervisor interacts. The Single Agent Dashboard conveys real-time information analyzed from a source conversational audio signal, allowing the Agent or Supervisor to visualize various aspects of the audio or conversation as it unfolds and providing various information to support decision-making during a conversation.

Multi Agent Dashboard: Real-time Graphical User Interface with which a Supervisor or Agent interacts. The Multi Agent Dashboard conveys real-time information about a number of simultaneous current Agent or Supervisor conversations, allowing visualization of various aspects of multiple conversations as they unfold, providing awareness of various characteristics of the conversation, and supporting decision-making.

Operation

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present invention.

Figure 1:
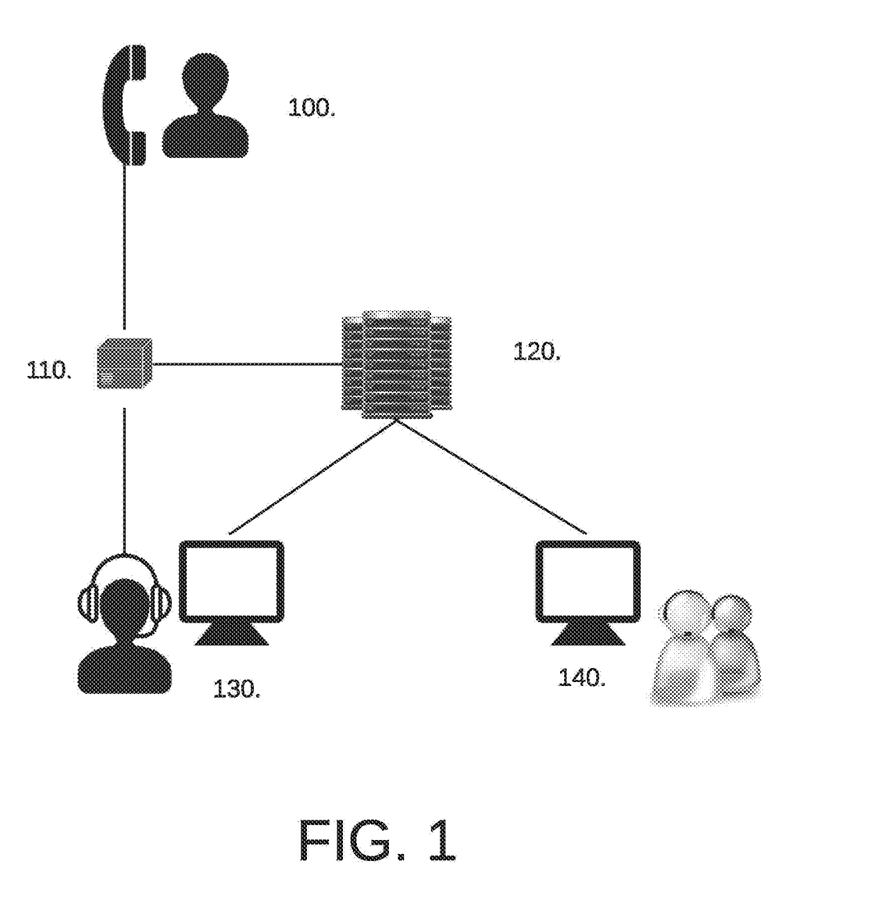
FIG. 1 is a high level system diagram
Figure 2:
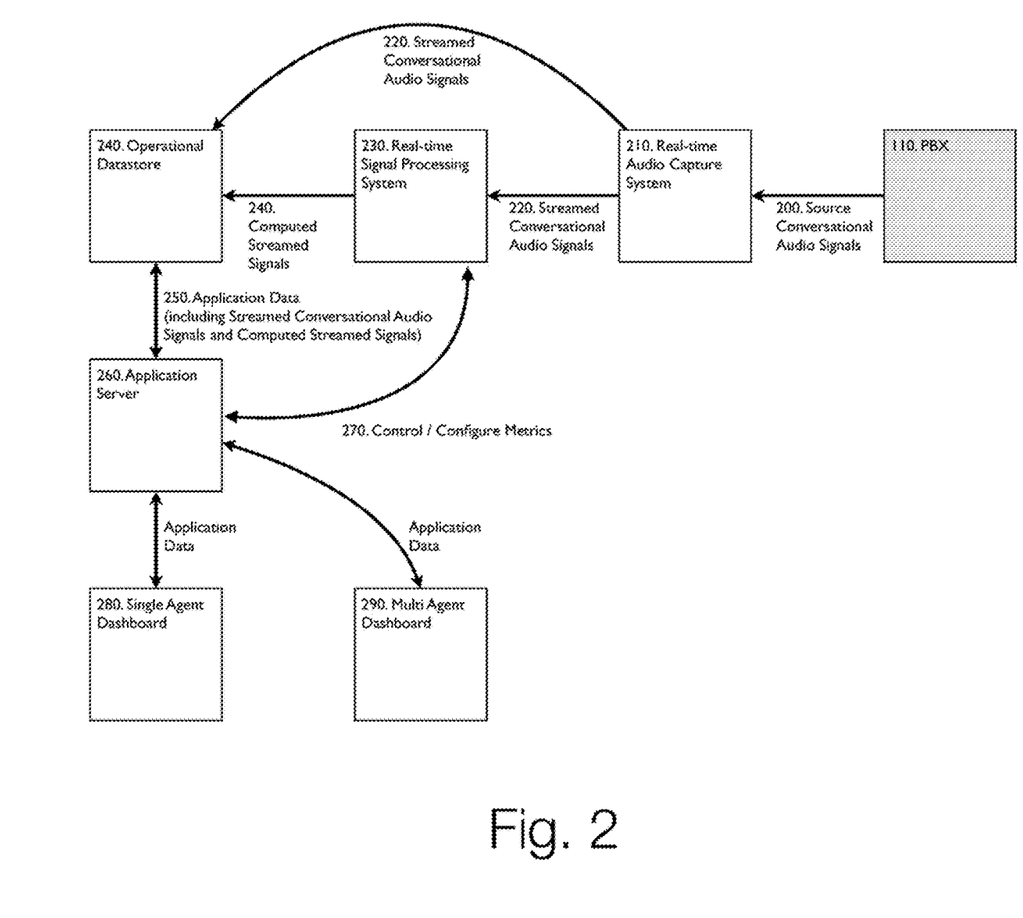
FIG. 2 is a diagram of system interaction.

Referring to FIG. 1, sound comes into the system through as digital audio signals, typically from associate 100 through a telephone call center's private branch exchange (PBX) 110. The PBX directs the call to an answering agent 130, and provides both associate and agent audio into analysis system 120. Real-time analysis produced by the analysis system is made available both to the agent and to any supervisors 140. Referring also to FIG. 2, analysis begins with source conversational audio signals 200 entering real-time audio capture system 210. The real-time audio capture system receives the source audio signals from the PBX or other source and converts and streams them as streamed conversational audio signals 220. This streaming provides audio to both real-time digital processing 230 and to operational datastore 240. This may be accomplished by duplicating the audio stream, multiplexing the audio stream to multiple destinations, or outputting a single stream for later processing.

Figure 3:
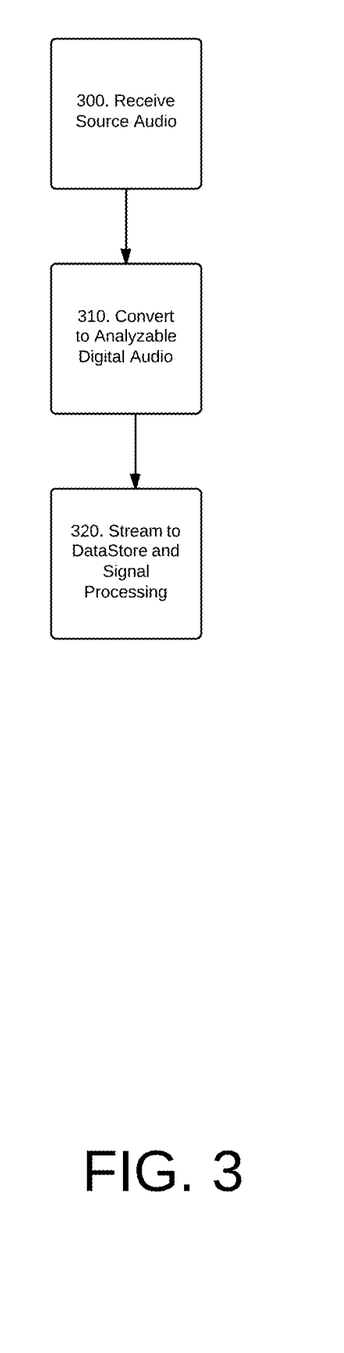
FIG. 3 is a flowchart of the real-time audio capture system process.

Referring also to FIG. 3, real-time audio capture system 210 is preferably a dedicated computer system with processor operating software to capture 300 source conversational audio signals, and convert 310 and stream 320 to multi-channel streamed conversational audio signals. Examples of capturing in a call center include using port mirroring if supported by a VoIP switch (sometimes alternatively referred to as port spanning or port monitoring) for use with an IP PBX, or integration through an application programming interface (API) supported by the specific PBX used, such as Avaya DMCC API or Cisco PBX API. While the preferred embodiment captures audio from phone call conversations, alternate embodiments may capture audio from alternative sources, such as microphone input, allowing source conversational audio signals to cover single speaker monologues to three- or more speaker multi-participant conversations. The preferred output stream is in WAV format, but alternative audio stream formats may also be used. The capture system requires sufficient processing power to capture, convert, and stream in real-time.

Figure 4:
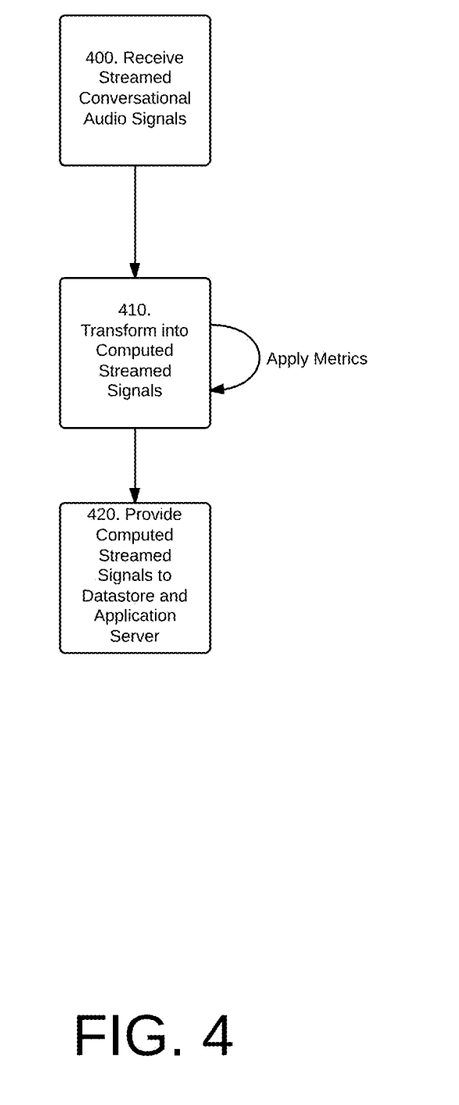
FIG. 4 is a flowchart of the real-time signal processing process.

The real-time audio capture system streams streamed conversational audio signals to a real-time signal processing system. Referring also to FIG. 4, real-time signal processing system 230 receives 400 the stream and transforms 410 the streamed conversational audio signals into computed streamed signals 240, and provides 420 the computed streamed signals to application server 250 and the operational datastore. The computed streamed signals are metrics based on the streamed conversational audio signals. One or more computed streamed signals may be produced at the same time. Computed streamed signals may be moving, running, or irregular streams of metrics. Metrics to compute may be statically configured in advance or dynamically configured while running, and new computations for metrics can be dynamically loaded. This enables both context-independent and context-dependent metrics to be run. Context dependency can be based on source information, such as participant-specific or location-specific information, or triggered by other metrics analyzing a current stream. Metrics may be configured through an extensible computational graph allowing any computation to be run.

The purpose of the metric computations is to produce data useful to agents and supervisors, helping characterize conversations to both improve the immediate real-time result of the conversation and also enable agent improvement over time. Some example metrics which are useful to display include, but are not limited to, conversational participation computations, conversational flow computations, dynamic variation computations, speaking rate computations, and vocal effort and hyper/hypo-articulation computations. Conversational participation metrics evaluate the fraction and change of fractions of the elapsed time of a conversation for which either, both, or neither participant speaks. Conversational flow metrics evaluate the how smoothness and connection of turn-taking in a conversation. Dynamic variation metrics evaluate how "flat" or "lively" a speaker sounds. Speaking rate metrics evaluate how fast or slow a participant speaks. Vocal effort and hyper/hypo-articulation metrics evaluate strain in speaking.

The real-time signal processing system is preferably a dedicated computer system with processor operating software to transform streamed conversational audio signals to computed streamed signals. In an alternative embodiment, the real-time signal processing system may be implemented on the same computing device as the real-time audio capture system, or even encoded in the real-time audio capture system software, but is preferably implemented on a separate computing device to distribute computing processing loaded. The processing required may vary with the number of streamed conversational audio signals and number and complexity of computed streamed signals, with a minimum requirement being sufficient to compute the metrics in real-time. The computed streamed signals may be directly provided to both the operational datastore and the application server, or directly to the operational datastore and indirectly to the application server by access request to the operational datastore.

Operational datastore 240 stores streamed conversational audio signals from the real-time audio capture system, computed streamed signals from the real-time signal processing system, and application data 250. The operational datastore is preferably a raid-based disk array used by a MongoDB database-based storage server, but can be any storage system able to meet the storage and data access demands in real-time. For performance purposes, the operational datastore is preferably a dedicated hardware system, but alternatively can be storage hardware controlled by software running on any of the other systems.

Storing both streamed conversational audio signals and the computed streamed signals in the datastore allows multiple features. Past audio can be reviewed by individual agents or supervisors. New or changed metrics can be applied to past audio to gain different insights than from metrics previously applied. Multi-call analysis may be applied across multiple stored audio signals.

Stored audio signals may also be used to create or improve analysis of metrics. While the acoustic metrics analyzed within conversation are context independent, the importance and connection of these metrics with outcomes or results may vary in different contexts. For example, agents focused on sales, technical support, or customer health may have different correlations between various audio metrics and call outcomes. Machine learning or other learning techniques may be applied to identify target metrics, or changes in metrics, useful in producing positive results. These, in turn, may be of use to agents and supervisors as gamified elements—target metrics or target changes likely to produce positive or better results. While the examples above apply to call center applications, the same learning may be applied to other outcome-oriented situations, such as results or outcome of a single-speaker talk, speech, or presentation with analyzable audio.

Application server 260 interacts with the operational datastore to access computed streamed signals, as well as agent dashboards to display data. The application server is preferable a dedicated computer with processor operating application software, but alternatively can be implemented as software on other system hardware. Different communication interfaces may be used, such as a RESTful interface and HTTP communication. Application server 260 may also communicate with real-time signal processing system 230 to configure and/or control which metrics are run. Certain metrics may be configured to always run, or to run under certain situations (for example, for a specific agent, for a specific associate, or for associates matching certain criteria such as calling from specific regions or about specific topics), or to run based on the results of other metrics being run. Metrics may also be controlled dynamically during a live call, such as requesting a specific metric be run for a call by an agent or supervisor.

Agent dashboards request and display application data from the application server. Single agent dashboards 280 are dedicated to display of data related to a single source conversational audio signal, such as a single call, and are preferably available to the agent on the single call and any supervisors of that agent. Multi-agent dashboards 290 display data related to multiple calls, and are preferably available to supervisors of multiple agents.

The single agent dashboard is a software graphical interface running on a agent's computing device to display real-time information about a single conversation in which the agent is participating. The single-agent dashboard may be implemented as a dedicated application, or through another accessible interface such as within a web browser. The single agent dashboard may also be accessed by a supervisor of the agent.

Figure 5:
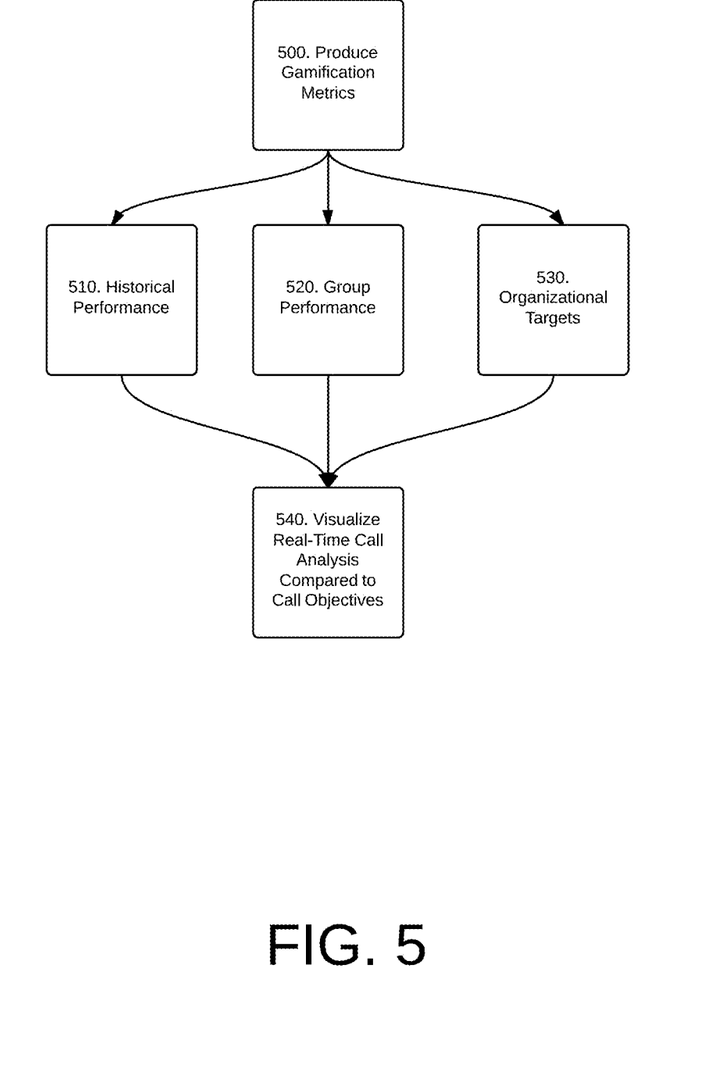
FIG. 5 is a flowchart of the application server process.

Referring also to FIG. 5, the single agent dashboard may present the metrics data about the audio, such as the call, for agent/supervisor consideration, or may also gamify the metrics 500. As used herein, gamification means comparing real-time values against an objective to motivate an individual to reach that objective. Gamification objectives may include historical audio metrics. This may include comparison to historical audio metrics 510 involving the agent or comparison to historical audio metrics from a team of agents 520 relevant to the current agent. Historical metrics may be presented as an average, range, or other easily discernible display such that the agent can identify how the current source of audio input, such as the call, is progressing compared to historical data. This may allow action by the agent, such as identification of aspects out-of-character in a particular conversation.

Gamefication objectives alternatively or additionally may include a target value 530 configured at an individual, team, or organizational level by supervisor or organization management. This target value may include or be based on learned analysis of connections between audio metrics and past business outcomes. Target metrics may be presented in a similar fashion as historical metrics, and provide both identification of aspects out-of-character and in-action or during-conversation goals for agents to target within the real-time metrics.

The multi-agent, or supervisor, dashboard is a software graphical interface running on a supervisor's computing device to display real-time information about current conversations for agents under the supervisor's supervision. The multi-agent dashboard may also display data about multiple conversations (live and historical) for a single agent. The multi-agent dashboard may be implemented as a dedicated application, or through another accessible interface such as within a web browser. Preferably, the supervisor can switch their interface between multi-conversation display of live current conversations, multi-conversation display for a single agent, and single conversation display for a single agent, with graphical interface selection tools to control the number and display arrangement of the multi-conversation display features.

In one embodiment, the multi-agent dashboard is a Java-based Windows desktop application that visualizes application data in real-time for multiple source conversational audio signals by connecting to an application server. Computed streamed signals are presented visually within the dashboard, and their values and appearance change in real-time based on changes in the audio signal of the underlying source conversational audio signal. Each source conversational audio signal may have multiple computed streamed signals, all of which have interval-value elements which may be changing in real-time to reflect during-conversation fluctuations in vocal aspects.

The multi-agent dashboard allows for the presentation of multiple real-time source conversational audio signals simultaneously. This allows for a supervisor to monitor multiple agents, each of whom may be participating in a conversation providing real-time source conversational audio signals. This dashboard provides a supervisor a tool to analyze situational awareness of how a team of agents is performing in any given context, for any set of goal-directed conversation behaviors.

The multi-agent dashboard can also present gamification data in the form of current performance compared to objectives based on historical data or configured metrics. The gamification data may be presented at individual levels, such as in association with each agent's real-time data, or at an overall level which may combine data from all agents to display overall team-wide metrics. Team-wide metrics may be compared to other teams within an organization.

Both the multi-agent dashboard and single-agent dashboard also can leverage historical computed streamed signal data and application data by accessing the operational datastore through the application server. Real-time application data provided through visualization of computed streamed signal data from agents can be visually compared to previous conversations. This allows a supervisor or agent to compare a single or set of real-time computed streamed signals to previous individual or sets of computed streamed signals.

The entire system, with end results visualized in the multi-agent dashboard, follows a capture-transform-visualize paradigm. The computed streamed signals are visualized without context, allowing a supervisor or agent to apply personal domain-specific knowledge and experience to the system's interpretation of the audio stream data. This personal knowledge and experience provides context for the values displayed in the dashboard, thus the computed streamed signals provide situational awareness within that context. This allows agents and/or supervisors users to act in real-time as audio events such as conversations are progressing. The same values of computed streamed signals may require different actions from agents and/or supervisors in different contexts, thus the system provides a decision support mechanism, allowing the agents and/or supervisors to utilize information to drive a real-time during-conversation decision making processes. This means that the system is not limited to a particular set of outcomes, contexts, or conversation types. The same computed streamed signal data can be provided in differing and/or new environments and provide situational awareness and value to agents and/or supervisors. In this sense, the system is not designed to provide limited analytical categorization, but rather provide context-free analytical visualization, which the agents and/or supervisors can leverage and combine with additional information, experience and knowledge to drive decision-making.

The system provides a gamification of application and computed streamed signal data, by visually comparing real-time data with baseline data, based on saved historical computed streamed signal data. This interface provides users with a way to visually compare 540 an individual agent in real-time during a conversation to his or her own past performance across many conversations, to the current or past performance of the team, or to specific company or program business objectives and expected outcomes. This is not an alert based system for specific baselines or categorizations, but a visual combination of real-time data with historical data. Supervisors can utilize this information within a specific context to drive decision-making. Agents can use this information within their own workflows to 'gamify' their work experience, whereas their goal becomes to achieve differentiated values of specific computed streamed signals relative to their own history, that of their teammates, team averages, or company stated objectives. Gamification may also apply to over-time analysis by giving agents different targets for improvement, such as specific aspects of conversations identified as needing improvement for individual agents, and altering such targets over time as agents improve their conversational metrics.

Other Embodiments

The Single Agent Dashboard and Multi Agent Dashboard, instead of being a Java based desktop application, may be implemented as a web-based application, or a mobile application, for any mobile operating system.

The Real Time Audio Processing System, instead of connecting to an enterprise PBX, may integrate directly with mobile audio streams through mobile OS integration, to VOIP web-based applications (Skype, etc) or to microphones. The system is capable of taking in audio that is part of an audio-video transmission, and is not limited to a single audio channel.

Through an API, Computed Stream Signals and Application Data may be visualized in displays other than a Single Agent Dashboard or a Multi Agent Dashboard. Such displays may be incorporated into alternative computing devices such as wearables (watches, jewelery, eye wear, etc.), desktop devices (clocks, phones, tablets, etc.), and furniture (desk, chair, cubicle wall, etc.).

The gamification may be extended to a larger team or company level. A large-screen or greater dashboard interface may display larger team or organization goals and objectives and update in real-time.

The input audio stream may be a two-person dialog (for example, a phone conversation), a multi-party discussion (for example, a meeting), or a monologue. The monologue may include issuing commands to a personal device (for example, telling a smartphone to "turn on"). In the case of monologues, some metrics which require multiple parties, such as analysis of turn-taking within a conversation, will not apply, but otherwise in such case "conversation" simply refers to the monologue event. Similarly the monologue, two-person dialog, or multi-party discussion may include one or more non-human actors (for example, avatars or interactive voice response systems).

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A gamification system for presenting analysis of speech audio signals in real-time, the system comprising:
   a real-time audio capture system configured to receive source conversational audio signals of current audio involving an agent and convert the received audio signals into analyzable digital audio as streamed audio conversational signals at low-latency;
   a real-time signal processing system configured to apply metrics to transform the streamed audio conversational signals into computed streamed behavioral signals at low-latency;
   an application server configured to provide the computed streamed behavioral signals to a computing device of the agent; and
   an agent dashboard operated on the computing device of the agent, the agent dashboard configured to display the computed streamed behavioral signals and gamification objectives for the agent,
   wherein the gamification system enables real-time comparison of computed streamed behavioral signals and displayed gamification objectives;
   wherein the gamification objectives include one or more target metrics that are identified using machine learning techniques to produce positive outcomes; and
   wherein the computed streamed behavioral signals are metrics comprising any of conversational participation computations, conversational flow computations, dynamic variation computations, speaking rate computations, vocal effort computations, and hyper/hypo articulation computations.

2. The system of claim 1, further comprising an operational datastore configured to store the streamed audio conversational signals and the computed streamed behavioral signals.

3. The system of claim 1, further comprising a computing device of a supervisor configured to operate a multi-agent dashboard displaying, at the same time, the computed streamed behavioral signals involving the agent and computed streamed behavioral signals involving one or more other agents.

4. The system of claim 1, wherein the source conversational audio signals are provided to the real-time audio capture system from a private branch exchange.

5. The system of claim 1, wherein the source conversational audio signals are provided to the real-time audio capture system from a voice over internet protocol switch.

6. The system of claim 1, wherein the applied metrics are statically configured in advance of receiving the source conversational audio signals.

7. The system of claim 1, wherein the applied metrics are dynamically configured during a conversation using metrics of a current stream.

8. The system of claim 1, wherein the applied metrics are configured to analyze one or more non-verbal audio aspects of speech.

9. The system of claim 1, wherein the gamification objectives include historical metrics.

10. The system of claim 9, wherein the historical metrics are for prior conversations involving the agent.

11. The system of claim 9, wherein the historical metrics are for prior conversations involving a team of multiple agents.

12. The system of claim 1, wherein the gamification objectives include a target value configured at an individual agent, team, or organizational level.

13. The system of claim 12, wherein the target value is based on learned analysis of connections between computed streamed signals and past business outcomes.

14. A method of presenting analysis of speech audio signals in real-time through gamification, the method comprising:
receiving source conversational audio signals of current audio involving an agent by a real-time audio capture system at low-latency;
converting, by the real-time audio capture system, the received audio signals into analyzable digital audio as streamed audio conversational signals at low-latency;
applying metrics, by a real-time signal processing system, to the streamed audio conversational signals to transform the streamed audio conversational signals into computed streamed behavioral signals at low-latency;
providing the computed streamed behavioral signals from an application server to a computing device of the agent at low-latency;
operating an agent dashboard on the computing device of the agent at low-latency; and
displaying, on the agent dashboard, the computed streamed behavioral signals and gamification objectives for the agent at low-latency,
wherein gamification enables real-time comparison of computed streamed behavioral signals and displayed gamification objectives;
wherein the gamification objectives include one or more target metrics that are identified using machine learning techniques to produce positive outcomes; and
wherein the computed streamed behavioral signals are metrics comprising any of conversational participation computations, conversational flow computations, dynamic variation computations, speaking rate computations, vocal effort computations, and hyper/hypo articulation computations.

15. The method of claim 14, further comprising storing, in an operational datastore, the streamed audio conversational signals and the computed streamed behavioral signals.

16. The method of claim 14, further comprising operating, on a computing device of a supervisor, a multi-agent dashboard and displaying, on the multi-agent dashboard at the same time, the computed streamed behavioral signals involving the agent and computed streamed behavioral signals involving one or more other agents.

17. The method of claim 14, further comprising providing the source conversational audio signals to the real-time audio capture system from a private branch exchange.

18. The method of claim 14, further comprising providing the source conversational audio signals to the real-time audio capture system from a voice over interne protocol switch.

19. The method of claim 14, further comprising statically configuring the applied metrics in advance of receiving the source conversational audio signals.

20. The method of claim 14, further comprising dynamically configuring the applied metrics during a conversation.

21. The method of claim 14, further comprising analyzing, through the applied metrics, one or more non-verbal audio aspects of speech.

22. The method of claim 14, further comprising including historical metrics in the gamification objectives.

23. The method of claim 22, further comprising including metrics from prior conversations involving the agent in the historical metrics.

24. The method of claim 22, further comprising including metrics from a team of multiple agents in the historical metrics.

25. The method of claim 14, further comprising configuring a target value in the gamification objectives at an individual agent, team, or organizational level.

26. The method of claim 25, further comprising basing the target value on learned analysis of connections between computed streamed signals and past business outcomes.

* * * * *

UNITED STATES PATENT AND TRADEMARK OFFICE
CERTIFICATE OF CORRECTION

PATENT NO. : 9,947,342 B2
APPLICATION NO. : 14/205602
DATED : April 17, 2018
INVENTOR(S) : Joshua Feast et al.

It is certified that error appears in the above-identified patent and that said Letters Patent is hereby corrected as shown below:

In the Claims

Column 14, Line 16 (Claim 18): "interne" is replaced with --internet--.

Signed and Sealed this
Twentieth Day of August, 2019

Andrei Iancu
*Director of the United States Patent and Trademark Office*